June 23, 1970   D. E. ALBRECHT   3,516,692
BRANCH PIPE CONNECTION
Filed Feb. 9, 1968   2 Sheets-Sheet 1

INVENTOR
DAVID EUGENE ALBRECHT
BY
ATTORNEYS

June 23, 1970   D. E. ALBRECHT   3,516,692
BRANCH PIPE CONNECTION
Filed Feb. 9, 1968   2 Sheets-Sheet 2

INVENTOR
DAVID EUGENE ALBRECHT

BY
*Bessie Smith & Hardy*

ATTORNEYS

United States Patent Office 3,516,692
Patented June 23, 1970

3,516,692
BRANCH PIPE CONNECTION
David Eugene Albrecht, Blue Bell, Pa., assignor to Allied Piping Products Company of Pennsylvania, Inc., Ambler, Pa., a corporation of Pennsylvania
Filed Feb. 9, 1968, Ser. No. 704,346
Int. Cl. F16l 13/02, 41/00
U.S. Cl. 285—156       5 Claims

ABSTRACT OF THE DISCLOSURE

A pipe is provided with a branch discharge orifice with a fitting secured adjacent to its exterior periphery. A branch pipe is provided through the outer end of the fitting with the inlet opening of the branch pipe a distance from the remotest point of the entrance of the fitting equal to from about 0.4 to 1.8 times the diameter of the entrance of the fitting. The square of the inside diameter of the branch pipe is equal to about .6 to about .8 times the square of the entrance of the fitting. The inside diameter of the branch pipe is substantially equal to the minimum contracted diameter of the unobstructed flow of liquid through the orifice and the inlet opening is positioned to be substantially in the region of maximum contraction of the fluid.

BACKGROUND OF THE INVENTION

In branch pipes employed to convey a liquid from a tank, main pipe or the like it has been the general practice to employ a branch pipe having an inside diameter much larger than the diameter of maximum contraction of the liquid flowing through the orifice. This results in very substantial turbulence as the fluid expands from its contracted state to fill the branch pipe with a resultant large loss of head and a large reduction in rate of fluid flow.

Loss of head is equal to $(1-C_v^2)h$ where $h$ is the head and $C_v$ is the coefficient of velocity. In a short tube of a length of 2 to 3 diameters having an inner diameter substantially equal to the diameter of the orifice entrance, $C_v$ is well-known to be about 0.82 which, in accordance with the foregoing formula, results in a lost head of $0.33h$. When employing a comparable structure in accordance with the invention, it has been found that $C_v$ is about 0.98 which provides a head loss, in accordance with the foregoing formula, of only $0.04h$.

Similarly, the rate of flow Q of fluid through a pipe of 2 to 3 diameters in length which is secured to an orifice is determined by the following formula in which A is equal to the area of the orifice entrance, V is equal to the velocity through the orifice and $C_v$ is the coefficient of velocity; $Q = A \cdot V \cdot C_v$. When $C_v$ is 0.82 incident to the use of a branch pipe having an inner diameter equal to the diameter of the orifice entrance, the rate of flow will be markedly less than in the situation where this invention is employed with a resultant $C_v$ of 0.98 since A and V are the same in both cases.

SUMMARY OF THE INVENTION

The invention provides a branch pipe for conducting a liquid discharging from an orifice of a fluid containing member such as a tank or a pipe. The arrangement of the branch pipe with respect to the orifice is such that turbulence incident to the expansion of the discharging liquid from its maximum contraction is eliminated. The basic inner diameter of the branch pipe is selected to be about equal to the diameter of the maximum contraction portion of the discharging liquid. However, the inlet end of the branch pipe has an enlarged inner diameter which is equal to that of the orifice in the main pipe. Advantageously, the square of the inner diameter of the branch pipe will be equal to about 0.6 to about 0.8 times the square of the inner diameter of the inlet end of the branch pipe. The basic inner diameter of the branch pipe will commence in the area of maximum contraction of the discharging liquid. Advantageously, the commencement of the basic inner diameter of the branch pipe will be a distance from the remotest point of the inlet end of the branch pipe equal to from about 0.4 to 1.8 times the inner diameter of the inlet end of the branch pipe.

If the branch pipe is joined to another pipe or a circular tank or the like, it will not have a true diameter at its entrance and when such is the case the term "diameter," as used herein, means the diameter of the pipe in which the entrance portion was formed.

These same results may be equivalently achieved by providing a fitting interposed between the pipe, tank or the like and the branch pipe, the fitting having an enlarged inner end with an inner diameter which is equal to the diameter of the orifice to which it is connected and which when squared is equal to 1.25 to 1.67 times the square of the nominal diameter of the fitting. In the pipe trade it is well known that a branch fitting of a stated "nominal diameter" has an inner diameter to accommodate the branch pipe which is denominated by the "nominal diameter" stated. Thus, a 2 inch branch fitting corresponds to and receives only a 2 inch branch pipe. The inner end of the branch pipe will be in the area of maximum contraction of the discharging liquid, advantageously at a distance from the remotest point of the entrance end of the fitting of from about 0.4 to about 1.8 times the inner diameter of the entrance of the fitting (the inner end). It will be understood that with certain types of fittings such as butt welded fittings, the fitting may have the inner diameter of its outer end equal to the inner diameter of the branch pipe and then the inner end of this portion of the fitting will be located in the same manner as the inner end of the branch pipe as set forth immediately above.

Thus it is seen the objects of the invention can be achieved by a branch pipe which comprises one or more parts.

PREFERRED EMBODIMENT OF THE INVENTION

Figure 1:
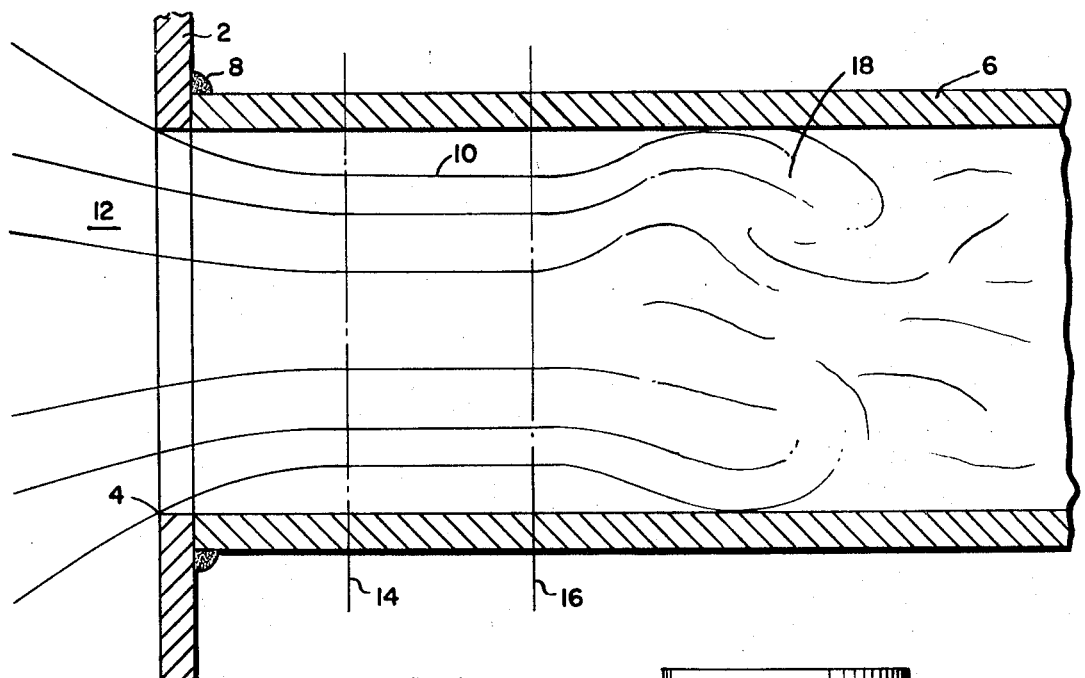
FIG. 1 is a vertical section, partially broken away, showing a tank discharge orifice and an associated branch pipe.
Figure 3:
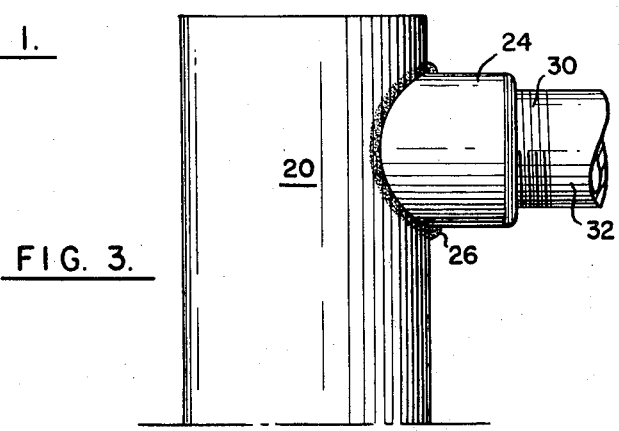
FIG. 3 is a front elevation, partially broken away, of the structure of FIG. 2.

By way of introduction, the preferred embodiment of the invention is to be contrasted to the situation illustrated in FIG. 1 where a tank 2 has an orifice 4 which is connected to a branch pipe 6 by welding as indicated at 8. The inner diameter of the branch pipe 6 is equal to the diameter of orifice 4. A liquid stream illustrated at 12 discharges through orifice 4 and contracts to a minimum diameter which extends between the construction lines indicated at 14 and 16 and then gradually expands to fill pipe 6. As the liquid expands, a substantial amount of turbulence 18 is produced which, as previously indicated results in a substantial loss of head and reduction of the rate of flow of fluid through pipe 6.

Figure 2:
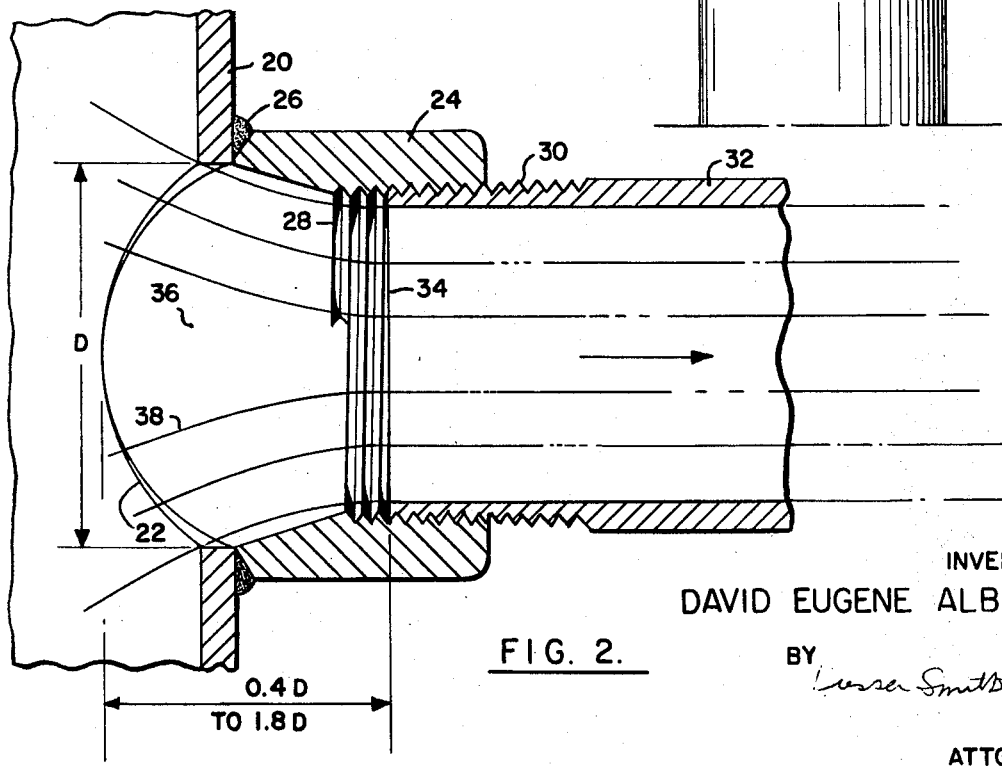
FIG. 2 is a vertical section, partially broken away, through a main pipe, a branch pipe fitting, and a branch pipe.

Adverting now to FIG. 2, a main liquid carrying pipe 20 has an orifice 22 with a branch fitting 24 secured about the outer periphery of the orifice as by welding indicated at 26. Fitting 24 is provided with tapered threads 28 which receive tapered threads 30 on the exterior or a branch pipe 32. The tapered threads act to position inner end 34 of pipe 32 a distance from the entrance end 36 of fitting 24 in the range of from .4 to 1.8 times the diameter of the entrance end of fitting 24 when pipe 32 is tightly screwed into fitting 24. The square of the inside diameter of the branch pipe is equal to about .6 to about .8 times the square of the inner diameter of the entrance end 36 of the orifice.

With the foregoing construction, the liquid stream 38 discharging through orifice 22 is fully contracted by the time it reaches the inner end 34 of pipe 32 and the diameter of the stream at this point is equal to the inner diameter of pipe 32. This results in a great reduction in loss of head and also results in a marked increase in the rate of liquid flow through pipe 32 as contrasted to the construction shown in FIG. 1.

Figure 4:
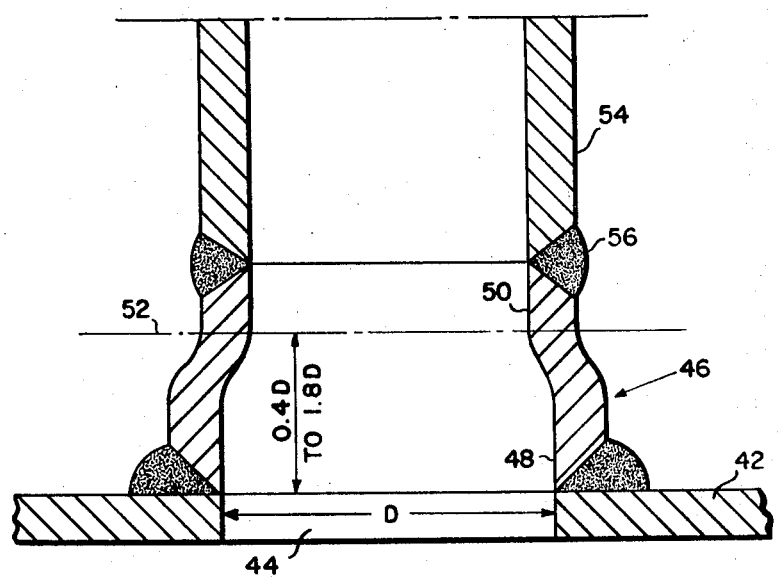
FIG. 4 is a horizontal section of an alternative branch pipe in accordance with the invention.
Figure 5:
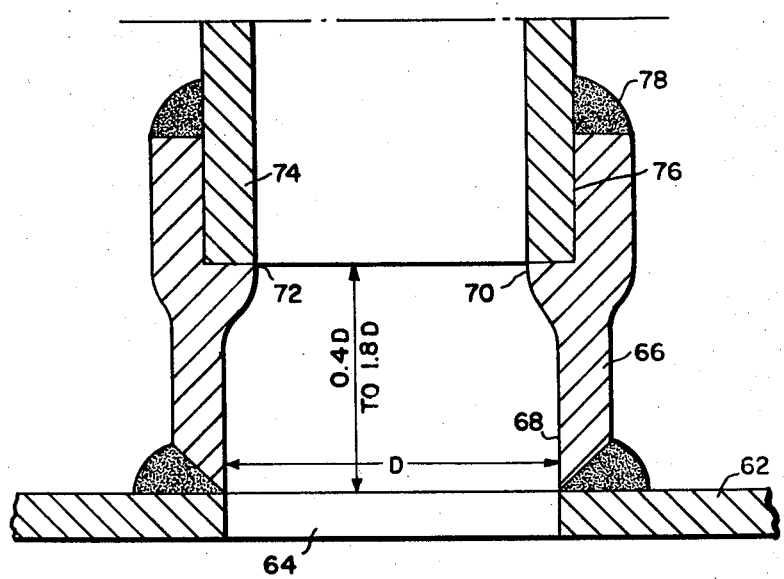
FIG. 5 is a horizontal section of an alternative branch pipe in accordance with the invention.

Alternative embodiments are shown in FIGS. 4 and 5 and differ from the preferred embodiment described above, essentially only in employing butt welded and socket fittings respectively in lieu of a threaded pipe and a threaded fitting as in the preferred embodiment.

Referring first to FIG. 4, a tank 42 has a discharge orifice 44 adjacent which is connected a branch pipe fitting 46. The inlet end 48 of the fitting 46 has an enlarged inner diameter equal to that of the orifice 44, while the discharge end of the fitting 46 has a reduced inner diameter 50 equal to the inner diameter of the selected branch pipe. Here again the inner diameter 50 is selected in the range of from about 0.6 to about 0.8 times the square of the inner diameter 48 of the inlet end of the fitting. The maximum inner diameter commences at the broken line indicated at 52 and will be in the range of from 0.4 to 1.8 times the diameter of the inlet end of the fitting. Fitting 46 is butt welded to a length of branch pipe 54 as indicated at 56. It will be evident that fittting 46 and pipe 54, in effect, form a branch pipe.

Referring now to FIG. 5, a tank 62 has a discharge orifice 64 adjacent which is connected a fitting 66 which has at its inlet end an enlarged diameter portion 68, the diameter of which is the same as that of the discharge orifice. Fitting 66 also has a reduced diameter portion 70 which reaches a maximum point indicated at 72 where it abuts against a pipe 74 which is received in a socket 76 formed in the discharge end of the fitting 66, the diameter of fitting 66 and the transverse plane in which point 72 lies is the same as the inner diameter of pipe 74. Pipe 74 is welded to fitting 66 as indicated at 78. Point 72 is a distance from the inlet end of fitting 66 in the range of 0.4 to 1.8 times the diameter of the inlet end of fitting 66.

It will be understood that the foregoing embodiment is illustrative and not limiting.

I claim:
1. A branch conduit having an inlet end connected to a fluid containing member having a branch discharge orifice,
    said inlet end having an enlarged inner diameter,
    a transition portion in said conduit between the enlarged inlet end of the conduit and the commencement of the basic inner diameter of the conduit, said conduit being of substantially uniform inner diameter for a substantial distance downstream of said commencement,
    the square of the uniform inner diameter of the conduit being equal to substantially 0.6 to substantially 0.8 times the square of the enlarged inner diameter of its inlet end, and
    the commencement of the basic inner diameter of the conduit being at a distance from the remotest point of the inlet end of the conduit equal to from substantially 0.4 to 1.8 times the maximum diameter of the inlet end of the conduit.
2. The branch conduit of claim 1 in which the inlet end of the conduit includes a fitting.
3. A fluid containing member having a branch discharge orifice,
    a fitting secured adjacent the external periphery of the orifice,
    a branch pipe of substantially uniform inner diameter mounted in the fitting,
    the square of the inside diameter of the branch pipe being equal to substantially .6 to substantially .8 times the square of the diameter of the entrance of the orifice, and
    the inlet opening of the branch pipe being a distance from the remotest point of the inlet of the fitting equal to from substantially 0.4 to 1.8 times the maximum diameter of the entrance of the fitting.
4. A branch pipe fitting having one end adapted to be connected to the side of a substantially round main pipe at a branch orifice in said main pipe and the other end adapted to be connected to a branch pipe of substantially uniform inner diameter,
    said one end of the fitting being contoured to intersect the side of said substantially round main pipe at the said orifice,
    the inner diameter between any two opposite points on said one end of the fitting when squared being equal to substantially 1.25 to substantially 1.67 times the square of the nominal inner diameter of the fitting, and
    means integral with the fitting to position the inner end of the branch pipe with each of said opposite points a distance from the inner end of the branch pipe equal to from 0.4 to 1.8 times said inner diameter of said one end of the fitting between said opposite points.
5. A branch pipe fitting having one end adapted to be connected to the side of a substantially round main pipe at a branch orifice in said pipe and the other end adapted to be connected to a branch pipe of substantially uniform inner diameter,
    said one end of the fitting being contoured to intersect the side of said substantially round main pipe at the said orifice,
    the inner diameter between any two opposite points on said one end of the fitting when squared being equal to substantially 1.25 to substantially 1.67 times the square of the nominal inner diameter of the fitting, and
    said fitting having a substantially uniform inner diameter portion of a diameter equal to the nominal diameter of the fitting, each of said opposite points being at a distance from the upstream end of said portion equal to 0.4 to 1.8 times said inner diameter of said one end of the fitting between said opposite points.

References Cited
UNITED STATES PATENTS

| 1,801,171 | 4/1931 | Mueller et al. | 285—177 X |
| 1,966,403 | 7/1934 | Durham | 285—158 |
| 2,015,246 | 9/1935 | Taylor | 285—189 |
| 2,463,006 | 3/1949 | Clute | 285—189 X |
| 2,915,324 | 12/1959 | Jackson | 285—286 X |

DAVE W. AROLA, Primary Examiner

U.S. Cl. X.R.

285—158, 177, 286